US011555889B2

(12) United States Patent
Grigsby et al.

(10) Patent No.: US 11,555,889 B2
(45) Date of Patent: Jan. 17, 2023

(54) INTERFEROMETRICS FOR MESA RADAR

(71) Applicant: BAE Systems Information and Electronic Systems Integration Inc., Nashua, NH (US)

(72) Inventors: Will R. Grigsby, Austin, TX (US); Joseph S. McGaughey, Austin, TX (US); Eric A. Rundquist, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 325 days.

(21) Appl. No.: 16/860,492

(22) Filed: Apr. 28, 2020

(65) Prior Publication Data
US 2021/0333359 A1 Oct. 28, 2021

(51) Int. Cl.
*G01S 7/41* (2006.01)
*H01Q 15/10* (2006.01)
(Continued)

(52) U.S. Cl.
CPC ............ *G01S 7/414* (2013.01); *G01S 13/885* (2013.01); *H01Q 15/0086* (2013.01); *H01Q 15/10* (2013.01)

(58) Field of Classification Search
CPC ... G01S 7/414; G01S 13/885; H01Q 15/0086; H01Q 15/10
(Continued)

(56) References Cited

U.S. PATENT DOCUMENTS

| 3,688,189 | A | * | 8/1972 | Lamb | ..................... G01N 22/00 |
| | | | | | 356/128 |
| 4,157,544 | A | * | 6/1979 | Nichols | ................. G01S 13/865 |
| | | | | | 342/120 |

(Continued)

FOREIGN PATENT DOCUMENTS

| EP | 3040737 | 7/2016 |
| WO | 2017165854 | 9/2017 |

(Continued)

OTHER PUBLICATIONS

3DAWS. Youtube video. https://www.youtube.com/watch?v=xbOD_8Ku0Oo.
(Continued)

*Primary Examiner* — Bernarr E Gregory
*Assistant Examiner* — Nuzhat Pervin
(74) *Attorney, Agent, or Firm* — Sand, Sebolt & Wernow LPA; Gary McFaline

(57) ABSTRACT

The present disclosure is a system comprising at least three electronically steered antennas arranged so that there is a baseline difference of a predetermined amount of wavelength between the centers of the antennas, typically configured as an obtuse or scalene triangle, where the distance between each antenna on an array is selected to provide the required accuracy and precision, the array having a timing circuit to ensure that the beam of each antenna is steered to the same azimuthal and elevation coordinates in space simultaneously. This enables the three electronically steered antennas to operate as an interferometer to determine a bearing to a target to ultimately determine the location thereof. The electronically steered antennas enable the system to be mounted on a platform in a small package that was previously difficult for traditional interferometers.

18 Claims, 7 Drawing Sheets

(51) Int. Cl.
*H01Q 15/00* (2006.01)
*G01S 13/88* (2006.01)

(58) Field of Classification Search
USPC .......................................................... 342/89
See application file for complete search history.

(56) References Cited

U.S. PATENT DOCUMENTS

| | | | | |
|---|---|---|---|---|
| 4,291,310 | A * | 9/1981 | Kruger | G01S 13/42 342/16 |
| 4,612,547 | A * | 9/1986 | Itoh | H01Q 3/26 342/417 |
| 4,642,649 | A * | 2/1987 | Lightfoot | G01S 5/04 342/458 |
| 5,223,845 | A * | 6/1993 | Eguchi | H01Q 3/08 342/359 |
| 5,666,202 | A * | 9/1997 | Kyrazis | B25J 9/1697 356/614 |
| 6,104,346 | A * | 8/2000 | Rudish | G01S 3/04 342/442 |
| 6,114,984 | A * | 9/2000 | McNiff | G01S 13/9023 342/146 |
| 6,771,218 | B1 * | 8/2004 | Lalezari | H01Q 1/28 342/373 |
| 7,233,285 | B2 * | 6/2007 | Struckman | G01S 5/04 342/451 |
| 8,120,526 | B2 * | 2/2012 | Holder | G01S 13/003 342/146 |
| 8,432,306 | B2 * | 4/2013 | Stagliano, Jr. | G01S 13/951 342/176 |
| 8,854,252 | B2 * | 10/2014 | Holder | H04B 7/086 342/107 |
| 9,401,741 | B2 * | 7/2016 | Holder | H04B 7/08 |
| 9,529,078 | B2 * | 12/2016 | Holder | H04J 11/0046 |
| 9,696,418 | B2 * | 7/2017 | Holder | G01S 13/003 |
| 10,571,224 | B2 * | 2/2020 | Holder | F41G 7/303 |
| 10,754,018 | B2 * | 8/2020 | Slemp | H01Q 21/08 |
| 11,169,240 | B1 * | 11/2021 | Shima | G01S 3/48 |
| 2003/0125880 | A1 * | 7/2003 | Fokkema | G01V 1/364 702/17 |
| 2004/0263387 | A1 * | 12/2004 | Lalezari | H01Q 21/205 342/373 |
| 2005/0012655 | A1 * | 1/2005 | Lalezari | H01Q 25/02 342/368 |
| 2005/0209664 | A1 * | 9/2005 | Hunter | A61L 31/10 607/115 |
| 2006/0087475 | A1 * | 4/2006 | Struckman | G01S 5/04 342/451 |
| 2007/0173199 | A1 * | 7/2007 | Sinha | H04W 16/10 455/67.11 |
| 2007/0198063 | A1 * | 8/2007 | Hunter | A61N 1/37512 607/3 |
| 2007/0273576 | A1 * | 11/2007 | Struckman | G01S 3/146 342/146 |
| 2009/0280153 | A1 * | 11/2009 | Hunter | A61L 27/54 607/2 |
| 2010/0033378 | A1 * | 2/2010 | Straatveit | G01S 3/46 702/180 |
| 2010/0268288 | A1 * | 10/2010 | Hunter | A61N 1/05 607/3 |
| 2013/0113651 | A1 * | 5/2013 | Leise | H01Q 21/061 342/146 |
| 2014/0240605 | A1 * | 8/2014 | Basawapatna | G01R 23/165 348/725 |
| 2014/0253368 | A1 * | 9/2014 | Holder | G01S 13/003 342/146 |
| 2015/0318881 | A1 * | 11/2015 | Barott | H04L 27/0012 375/285 |
| 2017/0370678 | A1 * | 12/2017 | Holder | G05D 1/0088 |
| 2018/0026365 | A1 * | 1/2018 | Driscoll | H01Q 25/007 342/379 |
| 2018/0031689 | A1 * | 2/2018 | Ben-Ari | H01Q 13/04 |
| 2018/0156891 | A1 * | 6/2018 | Brune | G01S 13/4463 |
| 2018/0267160 | A1 * | 9/2018 | Slemp | G01S 13/931 |
| 2018/0364351 | A1 * | 12/2018 | Weichman | G01S 13/90 |
| 2018/0372837 | A1 * | 12/2018 | Bily | G01S 7/032 |
| 2019/0033440 | A1 * | 1/2019 | Boolos | G01S 13/42 |
| 2019/0074600 | A1 * | 3/2019 | Bily | G01S 13/931 |
| 2019/0115651 | A1 * | 4/2019 | Driscoll | H01Q 13/106 |
| 2019/0137601 | A1 * | 5/2019 | Driscoll | G01S 13/931 |
| 2019/0372234 | A1 * | 12/2019 | Lipworth | H01Q 15/002 |
| 2019/0379133 | A1 * | 12/2019 | Driscoll | H01Q 21/0012 |
| 2020/0096625 | A1 * | 3/2020 | Slemp | H01Q 1/3275 |
| 2020/0191945 | A1 * | 6/2020 | Leabman | G01S 13/04 |

FOREIGN PATENT DOCUMENTS

| | | |
|---|---|---|
| WO | 2018089859 | 5/2018 |
| WO | 2019016670 | 1/2019 |
| WO | 2019055692 | 3/2019 |
| WO | 2019067788 | 4/2019 |

OTHER PUBLICATIONS

BAE Systems MAPS K-band Radar. Modular Active Protection Systems (MAPS) Overview; Metamaterial Electronically Scanned Array (MESA); Multi-Tone Range Estimation. (2017).

Holder, Jeff E. Angle-of-Arrival Estimation Using Radar Interferometry: Methods and applications (Radar, Sonar and Navigation). ISBN-10: 1613531842. Scitech Publishing. (2013).

* cited by examiner

INTERFEROMETRICS FOR MESA RADAR

STATEMENT OF GOVERNMENT INTEREST

This invention was made with government support under Prime Contract No. W56KGU-15-C-0067 awarded by the United States Army. The government has certain rights in the invention.

TECHNICAL FIELD

Embodiments of the present invention generally relate to electronically configurable and controllable antenna elements. More particularly, embodiments of the present invention relate to the control and configuration of amplitude and/or phase parameters of individual antenna elements such as, for example and without limitation, antenna elements of multi-element antenna arrays, metamaterial electronically scanned array (MESAs), and the combination of MESAs with interferometry elements and devices. Interferometers are devices that measure the interference pattern produced by the superposition of two or more waves, such as those of electromagnetic radiation. Interferometers can be used, in particular, for the accurate measurement of changes in distance and height.

BACKGROUND

Tracking objects in near real time, especially at ranges under 100 kilometers, requires highly accurate time-space-position information (TSPI) for multiple airborne, ground and naval objects being tracked. Range instrumentation radars typically use conventional monopulse techniques and are generally limited to tracking one object at a time. Standard phased array radars can track multiple objects, but are limited in accuracy by the size, weight, and power considerations of the system. Typically, the precision and accuracy of TSPI measurements are increased as the distance between the measuring sensors (such as radar elements in a phased array) is increased. When this is done in a conventional phased array, the array grows by the square of the distance, thus proportionally increasing the size, the weight, and the power consumed by the large number of transmit/receive modules. These conventional methods increase the cost and complexity of the phased array through the growth in support systems needed to power, cool, and monitor the status of the system.

In antenna theory, a phased array usually means an electronically scanned array, a computer-controlled array of antennas which creates a beam of radio waves that can be electronically steered to point in different directions without moving the antennas. In an array antenna, the radio frequency current from the transmitter is fed to the individual antennas with the correct phase relationship so that the radio waves from the separate antennas add together to increase the radiation in a desired direction, while cancelling to suppress radiation in undesired directions. In a phased array, the power from the transmitter is fed to the antennas through devices called phase shifters, controlled by a computer system, which can alter the phase electronically, thus steering the beam of radio waves to a different direction. Since the array must consist of many small antennas (sometimes thousands) to achieve high gain, phased arrays are mainly practical at the high frequency end of the radio spectrum, in the UHF and microwave bands, in which the antenna elements are conveniently small.

Generally, antennas can be classified into three categories: omni-directional, semi-directional, and highly directional antennas. These three general antenna categories have different electromagnetic signal directional and gain characteristics (often referred to as "directivity"). Antenna directivity can be defined as the ratio of radiation intensity in the direction of the antenna's peak intensity or the desired direction of operation to the average radiation intensity in all other directions (e.g., total integrated power in all directions captured by the denominator of the ratio which includes the direction of interest). In addition to directivity, antennas are characterized by a radiation pattern, which can be either a two-dimensional or three-dimensional graphical plot of the antenna's signal intensity versus a reference angle.

Omni-directional antennas can have a broad radiation pattern and transmit and receive electromagnetic signals nearly uniformly in all directions. Examples of omni-directional antennas include dipoles, discones, masks, and loops. Semi-directional antennas are capable of focusing desired energy and signals in a desired direction. Examples of semi-directional antennas include patch antennas, panel antennas (both patch and panel antennas are also referred to as "planar antennas"), and Yagi antennas (e.g., a directional antenna having a horizontal conductor with several insulated dipoles parallel to and in the plane of the conductor).

Semi-directional antennas offer improved gain over omni-directional antennas in the desired direction of operation while reducing the gain of and/or potential interference from signals in other directions. As noted above, these characteristics of semi-directional antennas are referred to as directivity. Highly directional antennas provide a smaller angle of radiation in the desired direction of operation, a more focused beam, and a narrower beam width compared to the above-described general antenna types. Examples of highly directional antennas include parabolic dish, fixed arrays, and grid antennas (a grid antenna resembles, for example, a rectangular grill of a barbecue with edges slightly curved inward. The spacing of the wires on a grid antenna is determined by the designed operational wavelength of the antenna.).

All three of the above-described general antenna types (i.e., omni-directional, semi-directional, and highly directional antennas) can also be classified as fixed antenna designs. A fixed antenna design is one that has a fixed gain, a fixed radiation pattern (e.g., fixed directionality), and a fixed direction of operation. An example of a fixed, highly-directional antenna is the parabolic dish antenna, which is commonly used in satellite communications. The parabolic dish antenna includes a reflector that is sized to produce the desired antenna gain and beam width for a specific radiation pattern and can be oriented in the desired direction of operation.

While particularly suitable for fixed gain, fixed location, fixed distance, and fixed direction communication systems, fixed antenna designs are not particularly suitable for applications requiring variable direction and/or variable gain. For example, the gain and radiation pattern of a parabolic dish antenna are fixed based on the size and design of the dish's reflector, and the direction of operation can only be changed by changing the dish's physical orientation. These disadvantages and limitations of static parabolic dish antennas apply to most fixed antenna designs.

An antenna design that offers advantages over the aforementioned limitations of fixed antenna designs is an electronically steerable antenna (ESA) or phased array antenna. This type of antenna can be utilized either in a fixed location or in a portable (or mobile) environment. A single ESA can be designed to produce omni-directional, semi-directional, and highly directional antenna radiation patterns or directivity. The directivity and gain of the ESA are determined by the number and physical arrangement of antenna array elements and the ability to determine and control the relative phase shifts and/or amplitudes between antenna array elements.

An ESA can electronically change its gain and radiation pattern (e.g., directivity), as well as its direction of operation, by varying the relative phase shift and/or amplitude of its antenna array elements. Furthermore, an ESA does not require any mechanical components, such as a motor or a servomotor, to charge its direction of operation, its gain, or its radiation pattern. This allows both its size and weight to be reduced, making the ESA an ideal candidate for portable (or mobile) communication and detection systems. Additionally, because the ESA operational parameters can be modified electronically, the direction of operation of the ESA can be changed more rapidly than a fixed antenna design, making the ESA a good antenna technology to locate, acquire, and track fast moving signals, objects, or items.

Conventional ESA arrays use variable phase shifters (e.g., time delay phase shifters, vector modulators, and digital phase shifters) to control directivity. The input dynamic range and resolution of such phase shifters, however, is limited, which limits the accuracy at which a determined configuration of relative phase shifts can be set. In turn, this limits the accuracy of the resulting beam steering angle of the antenna array and the suitability of the antenna array for certain applications (e.g., high mobility applications). Increasing the number of antenna elements of the array typically allows greater accuracy of beam steering angle but comes with an increased footprint and cost.

Interferometers are devices that measure the interference pattern produced by the superposition of two or more waves, such as those of electromagnetic radiation. Interferometers can be used, in particular, for the accurate measurement of changes in distance.

SUMMARY

Wherefore it is a desire of the present disclosure to overcome the above-mentioned shortcomings and drawbacks associated with the prior state-of-the-art radar tracking systems. One aspect of the present disclosure is a system comprising at least three electronically steered antennas arranged so that there is a baseline difference of a predetermined amount of wavelength between the centers of the antennas, typically an obtuse or scalene triangle, where the distance between each antenna on an array is selected to provide the required accuracy and precision, the array having a timing circuit to ensure that the beam of each antenna is steered to the same azimuthal and elevation coordinates in space simultaneously.

The transmit signal of the array can be any frequency within the element bandwidth and may allow for the imposition of coded waveforms on the transmitted carrier frequency, which codes are subsequently decoded by the receive electronics of the array, allowing for processing of the received signals using conventional, non-conventional, and orthogonal interferometry techniques.

In one embodiment of the system, the set of three antennas is mounted on any type of platform such as a building, vehicle, geological formation, terrain, or other point of reference pointed in a single direction where the system performs a self-survey and self-calibration in order to record an actual position for which very accurate measurement reference is required. In this embodiment of the system the data provided is extremely accurate position of the target in near real-time for remote objects regardless of whether they are moving or stationary and regardless of whether they are land-based, sea-based, or airborne.

In one embodiment of the system, the set of three antennas are mounted on a positioner or frame that can physically scan the environment in which the antennas are placed in any desired pair of azimuthal and elevation coordinates while physically mounted on a building, vehicle, geological formation, terrain, or other point of reference in an area where the system performs a self-survey and self-calibration in order to record an actual position for which very accurate measurement reference is required, in this embodiment of the system the data provided is extremely accurate TSPI (Time Space Position Information) measurement of airborne objects.

In one aspect, an exemplary embodiment of the present disclosure may provide an electronically steered radar array comprising: a plurality of antenna elements that are arranged in a two-dimensional array; the plurality of antenna elements operable to transmit a radio-frequency signal and receive a plurality of reflected electromagnetic frequency signals; the plurality of antenna elements operable to step the transmitted electromagnetic frequency signal through a range of frequencies; a signal processing application coupled to the plurality of antenna elements and operable to: receive the reflected electromagnetic frequency signals from the plurality of antenna elements as they are electronically steered with respect to the target or object to be detected; determine the number and location of ambiguities received in the reflected radio-frequency signals; and determine which of the ambiguities represents a real object. This exemplary embodiment or another exemplary embodiment may further provide wherein the plurality of antenna elements are arranged in a triangular formation. This exemplary embodiment or another exemplary embodiment may further provide wherein the plurality of antenna elements comprises a two-dimensional array of antenna elements. This exemplary embodiment or another exemplary embodiment may further provide wherein the plurality of antenna elements is operable to step the transmitted electromagnetic-frequency signal through a range of frequencies. This exemplary embodiment or another exemplary embodiment may further provide wherein the range of frequencies extends from 5 MegaHertz to 130 Gigahertz. This exemplary embodiment or another exemplary embodiment may further provide wherein the plurality of antenna elements comprises three antenna elements. This exemplary embodiment or another exemplary embodiment may further provide, wherein the plurality of antenna elements is configured on a portable platform. This exemplary embodiment or another exemplary embodiment may further provide wherein the portable platform comprises a land-based vehicle. This exemplary embodiment or another exemplary embodiment may further provide wherein the plurality of antenna elements is oriented in a fixed orientation relative to one another. This exemplary embodiment or another exemplary embodiment may further provide wherein the plurality of antenna elements is operable to receive at least a portion of the reflected electromagnetic-frequency signals with a vertical separation that differs from one another. This exemplary embodiment or another exemplary embodiment may further provide wherein the plurality of antenna elements are arranged in linear formation. This exemplary embodiment or another exemplary embodiment may further provide wherein the plurality of antenna elements are arranged in an obtuse triangular formation. This exemplary embodiment or another exemplary embodiment may further provide wherein the antenna array is arranged so that the antenna array detects more than 6 ambiguities. This exemplary embodiment or another exemplary embodiment may further provide wherein the antenna array determine which ambiguity is a real target in less than 500 milliseconds. However, this is a variable parameter that can be decreased depending on implementation. For example, a shorter processing interval (CPI) will reduce this time.

In another aspect, an embodiment of the present disclosure may provide an electronically steered antenna system comprising: a plurality of Metamaterial Electronically Scanning Array (MESA) receivers that are arranged in an array; the plurality of MESA receivers operable to receive a plurality of reflected electromagnetic frequency signals; interferometer logic coupled to the plurality of MESA receivers and operable to: receive the reflected electromagnetic frequency signals from the plurality of antenna elements as they are steered with respect to a target location; determine a number and location of ambiguities received in the reflected electromagnetic frequency signals; and determine which of the ambiguities represents a real object at the target location. This exemplary embodiment or another exemplary embodiment may further provide a two-dimensional configuration of the MESA receivers arranged in the array. This exemplary embodiment or another exemplary embodiment may further provide at least three antenna MESA receivers in the array that are each coupled with the interferometer logic. This exemplary embodiment or another exemplary embodiment may further provide a fixed orientation of each MESA receiver relative to the other MESA receiver in the array. This exemplary embodiment or another exemplary embodiment may further provide a linear configuration of the three MESA receivers. This exemplary embodiment or another exemplary embodiment may further provide a triangular or modified linear configuration of the three MESA receivers. This exemplary embodiment or another exemplary embodiment may further provide an obtuse triangular configuration of the three MESA receivers. This exemplary embodiment or another exemplary embodiment may further provide a scalene triangular configuration of the three MESA receivers. This exemplary embodiment or another exemplary embodiment may further provide a right triangular configuration of the three MESA receivers.

In another aspect, an embodiment of the present disclosure may provide a method comprising: detecting, via a plurality of Metamaterial Electronically Scanning Array (MESA) receivers in an electronically steered antenna system, a signal representing the presence of an object at a target location; scanning an area around the target location; receiving data representing ambiguities and the object after scanning the area; comparing the received data; mapping the ambiguities; electronically steering the antenna system to scan an area around at least one ambiguity having been mapped; determining, via interferometer and other logic, whether the ambiguity represent the object at the target location or is an ambiguity that is a result of phase wrapping in the received data; wherein if there if not a valid target detection, electronically steering the antenna system to the next ambiguity or potential target and repeat the determination for the next point; and wherein if a valid target is detected, then transfer or present, automatically, that position to a user or other computer system. This exemplary method or another exemplary method may further provide acquiring and tracking the target with the electronically steered antenna system having a plurality of MESA receivers; estimating a range or range-rate (Doppler velocity) to the target location; compiling a database of the geographical area immediately surrounding the target; switching the antenna system from a monitoring or detecting mode into an interferometer mode. Once an SNR threshold is crossed, then the radar will/can change from detection to interferometer (or tracking) mode. wherein the SNR is associated with the detecting mode; determining a number and location of ambiguities received in reflected electromagnetic frequency signals; determining which of the ambiguities represents the object at the target location; and acquiring angular information for the object at the target location using the electronically steered antenna system in the interferometer mode. This exemplary method or another exemplary method may further provide dynamically reconfiguring the electronically steered antenna system between the monitoring mode and the interferometer mode to update the target state, such as the range, range-rate, Azimuth, elevation or other feature information.

In another aspect, an embodiment of the present disclosure may provide a method of tracking a target using a radar system configurable between a monitoring mode of operation and an interferometer mode of operation, the method comprising: acquiring and tracking the target using the radar system in the monitoring mode; estimating a range to the target using a receiver of the radar system; compiling a database of the geographical area immediately surrounding the target; configuring the radar system from the monitoring or detecting mode into the interferometer mode; determining the number and location of ambiguities received in the reflected electromagnetic frequency signals; determining which of the ambiguities represents a real target; and acquiring angular information for the target using the radar system in the interferometer mode wherein the radar system in the interferometer mode. This exemplary embodiment or another exemplary embodiment may further provide dynamically reconfiguring the radar system, under control of a computer/processor or other logic between the monitoring mode and the interferometer mode to update the range, range-rate, and the angular information.

In yet another aspect, an exemplary embodiment of the present disclosure may provide at least three electronically steered antennas arranged so that there is a baseline difference of a predetermined amount of wavelength between the centers of the antennas, typically configured as an obtuse triangle, where the distance between each antenna on an array is selected to provide the required accuracy and precision, the array having a timing circuit to ensure that the beam of each antenna is steered to the same azimuthal and elevation coordinates in space simultaneously. This enables the three electronically steered antennas to operate as an interferometer to determine a bearing to a target to ultimately determine the location thereof. The electronically steered antennas enable the system to be mounted on a platform in a small package that was previously difficult for traditional interferometers.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

One exemplary problem that communication designers tried to solve is how to locate with accuracy a target in a position. There are multiple ways that this can be done. This could be done with two antennas, namely, a transmit antenna and a receive antenna or a single antenna that interleaves transmit and receive functions. The gain pattern of the antenna determines what type of information can be received or transmitted, such as the strength of signals. One exemplary way to obtain angular information is to steer the beam. During steering, the signal is observed to determine how the signal return strength varies as the antenna is moved around in space. Using this angular information, by integrating it over time it can estimate where a target is located. However, this takes time. Further, the angular resolution is limited by the beam size that is output and signal to noise ratio (SNR).

The present disclosure addresses these concerns by providing an interferometer formed from multiple antenna receivers. They can be any type of antenna. In one embodiment, a plurality of metamaterial electronically scanned array (MESA) receivers are all sampled at the same time in a single instance, or a single processing interval. Then with a single "snapshot," the system of the present disclosure is able to estimate where the target is located. Thus, the configuration of the present disclosure reduces the need to scan around in time and position in trying to map out the location of the intended target. By doing so and comparing the relative phase in the interferometer, the system is able to obtain a higher accuracy and potential than the more traditional approaches. The system provides measurements on each "snapshot" or coherent processing interval to obtain highly accurate data more frequently.

Figure 1:
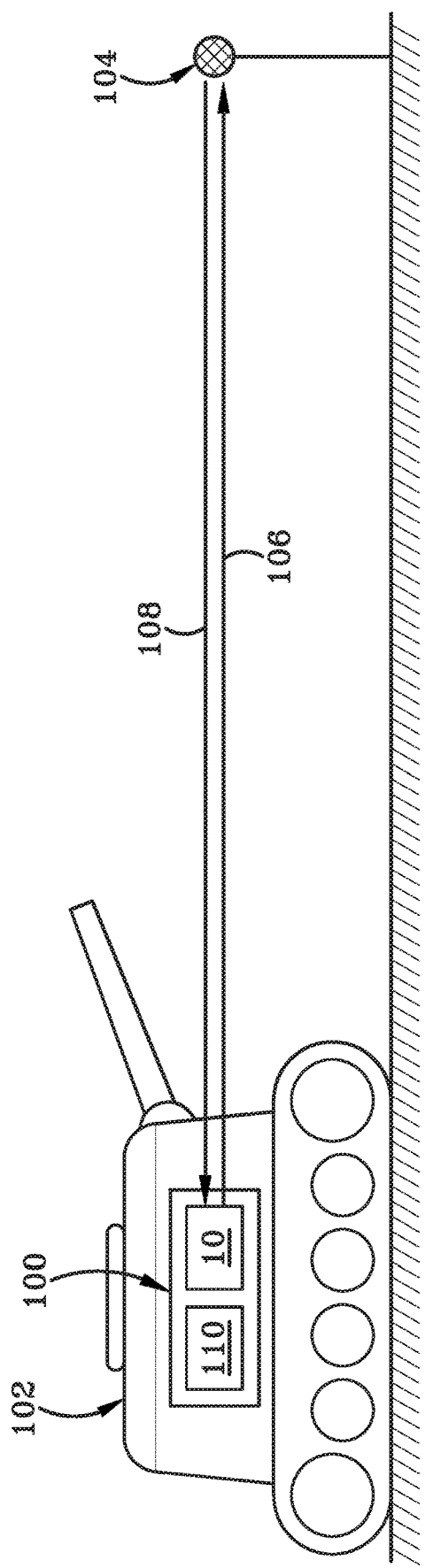
FIG. 1 is a diagrammatic environmental view of an antenna system in accordance with one aspect of the present disclosure shown on a platform to locate a target.

FIG. 1 depicts a diagrammatic environmental view of a modular active protection system (MAPS) of the present disclosure. The MAPS system is shown generally at 100. MAPS system 100 is carried by a platform 102 that may be any stationary or moveable device. In one particular embodiment, platform 102 is a vehicle, which may be manned or unmanned, and may be land-based, water-based, or aerial-based. However, platform 102 could equally be a fixed installation, such as a telecommunications tower. System 100 on platform 102 is configured to operate as an interferometer to detect the location of a target 104 remote from the platform 102 by transmitting a transmit signal 106 and receiving a receive or carrier signal 108 returning from target 104. As will be described in greater detail below, system 100 includes interferometer logic 110 that is coupled with an antenna array 10. As will be described in greater detail herein, antenna array 10 utilizes the difference in radio frequency phase between multiple receiver antenna elements on the antenna array 10 to determine the location and radial velocity of target 104 relative to platform 102. More particularly, antenna array 10 determines the bearing of target 104 as determined by the analysis of anomalies or ambiguities that are present during the reception of the return or receive signal 108. By exploiting the ambiguities in the receive signal 108, the bearing accuracy of the location of target 104 is able to be improved over standard monopulse antenna arrays, which are similarly sized. Thus, system 100 is able to provide an improved ability to locate a remote target 104 without significantly increasing size, weight, power, and cost to the production of system 100 or platform 102.

Figure 2:
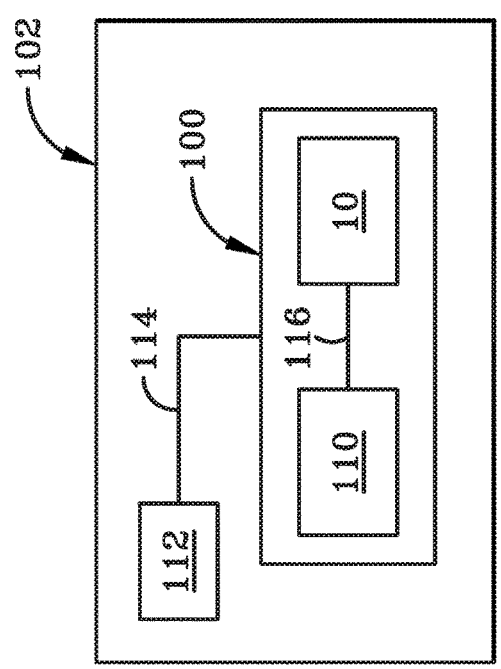
FIG. 2 is a schematic view of the antenna system of the present disclosure.

FIG. 2 diagrammatically depicts platform 102 as having a legacy or integrated power source or power system 112 that is connected to system 100 via power line 114 to operate the components of logic 110 in the antenna array 10. Accordingly, system 100 may be considered a modular unit that can be swapped out and replaced for a legacy existing standard monopulse array antenna that is ordinarily carried by a platform 102. This enables system 100 to be retrofitted into existing platforms 102 without need to entirely rebuild or construct a new platform. However, it is to be equally understood that system 100 could be constructed on a new platform 102. Power source 112 powers the interferometer logic 110 as well as the antenna array 10. Logic 110 may be coupled to antenna array 10 via a wired or wireless connection 116. Further, as the logic 110 is shown as being directly connected to antenna array 10 via connection 116, if connection 116 is a wireless connection, it is possible for the interferometer logic 110 to be located remotely from the antenna array 10. The remote connection effectuated by a wireless connection 116 could place the interferometer logic 110 at other locations on platform 102 or at another location remote from platform 102 and still be encompassed by system 100. In this instance, the interferometer logic 110 could be powered by an alternative power source different than power source 112. As will be described in greater detail herein, the antenna array 10 has a plurality of antenna elements thereon that can be used as an interferometer to capture return signal 108 information in a single processing interval to obtain a bearing of the platform 102 relative to the target 104.

Figure 3A:
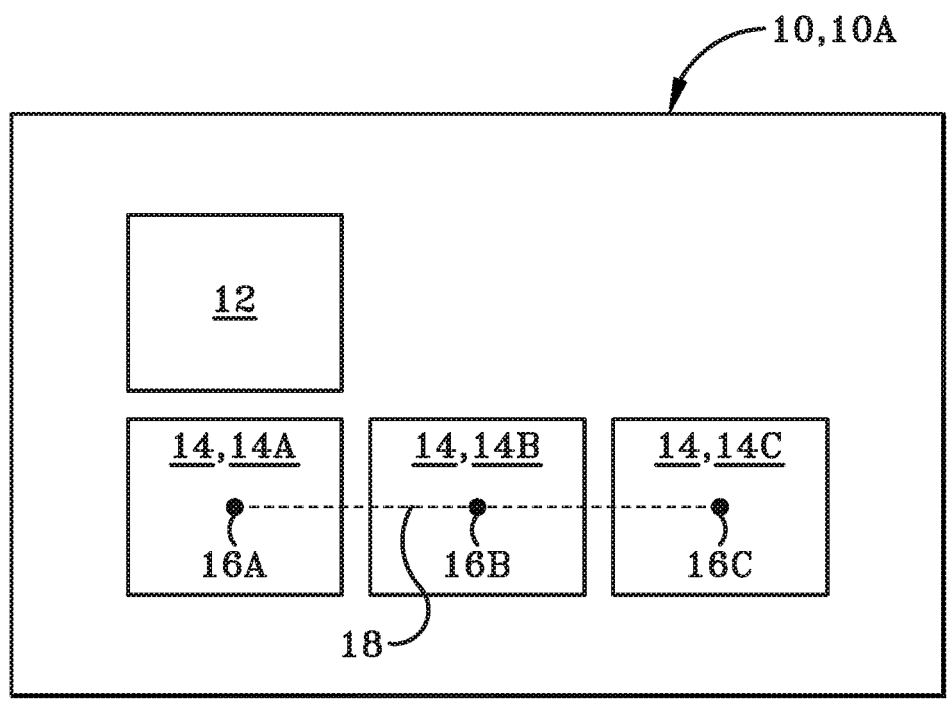
FIG. 3A is a schematic view of a first embodiment antenna array in accordance with one aspect of the present disclosure.
Figure 3B:
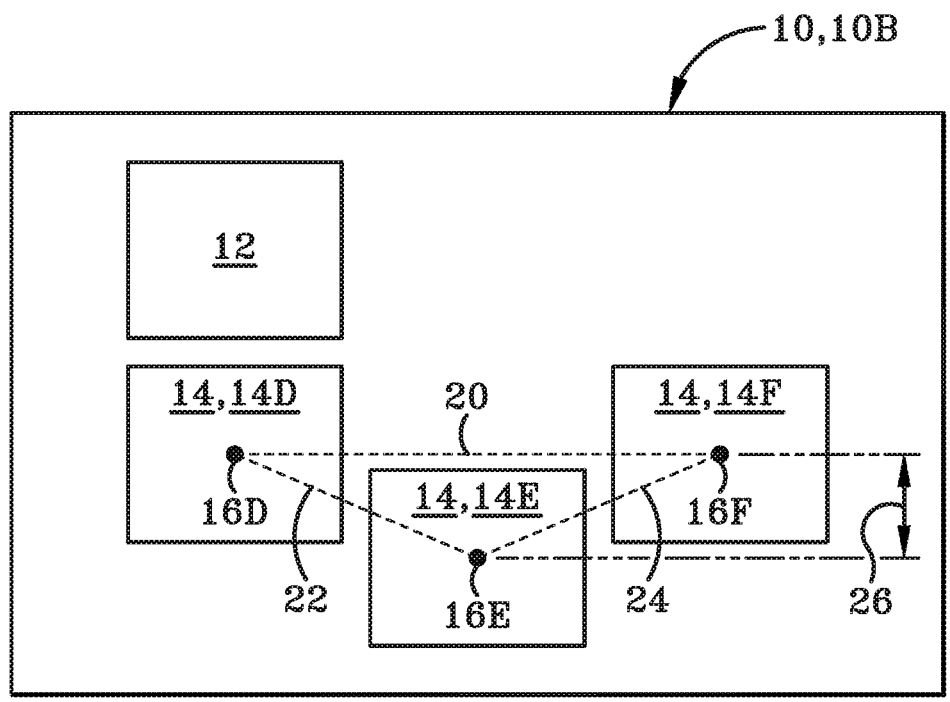
FIG. 3B is a schematic view of another exemplary embodiment of an antenna array according to another aspect of the present disclosure.
Figure 3C:
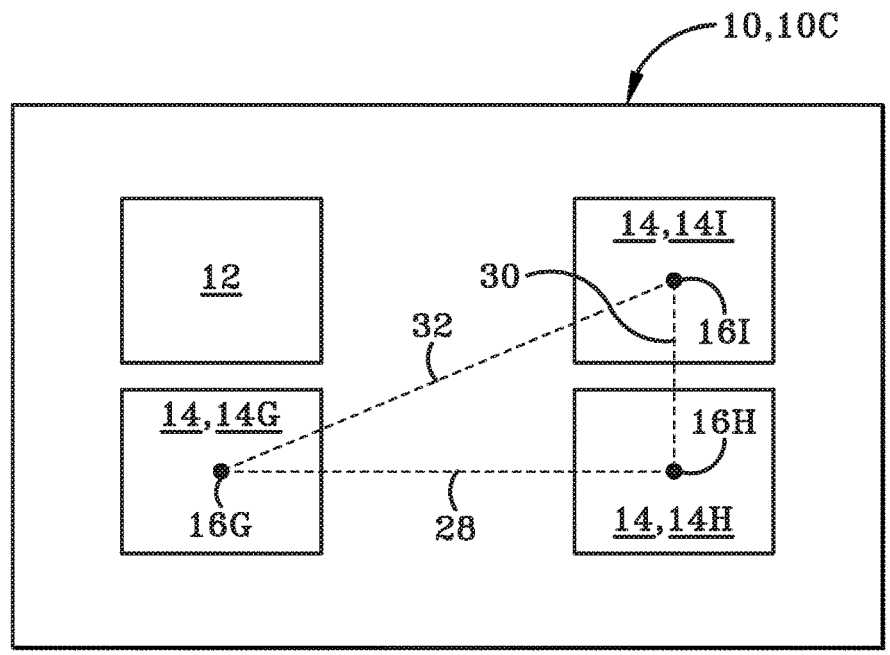
FIG. 3C is a schematic view of another exemplary antenna array according to another aspect of the present disclosure.
Figure 3D:
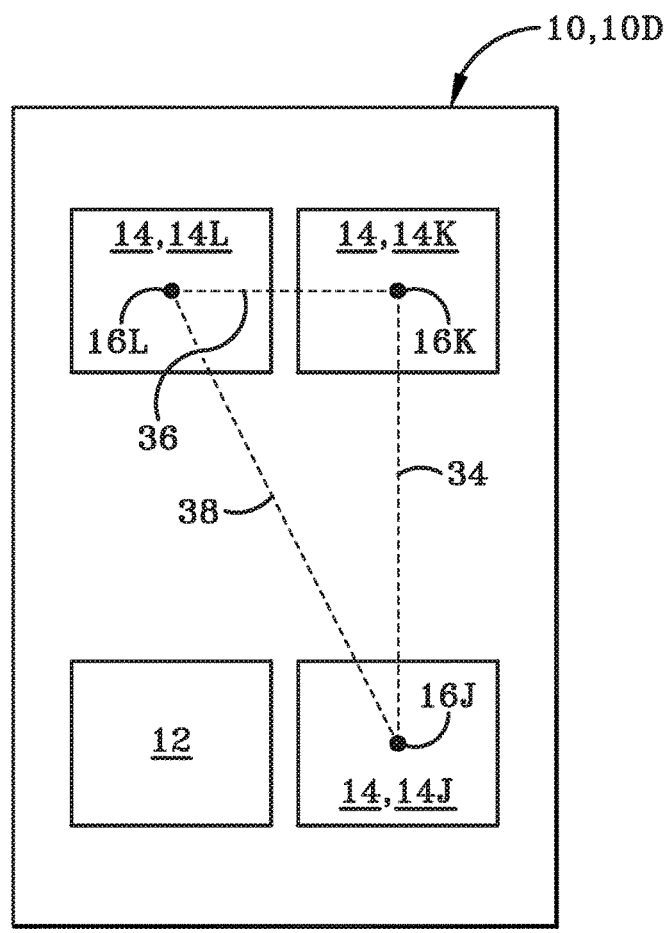
FIG. 3D is a schematic view of another exemplary antenna array according to another aspect of the present disclosure.

FIG. 3A-FIG. 3D depict four different embodiments of an antenna array 10. Namely, FIG. 3A depicts a first embodiment antenna array 10A, FIG. 3B depicts a second embodiment antenna array 10B, FIG. 3C depicts a third embodiment antenna array 10C, and FIG. 3D depicts a fourth embodiment antenna array 10D. Each antenna array 10A-10D includes a transmitter 12 that is configured to generate or transmit the signal 106 outbound towards the target 104. The transmitter 12 may be a conventional transmitter that is capable of transmitting electromagnetic pulses or continuous waves (CW) as the transmit signal 106. Each antenna array 10 (namely, 10A-10D) has a plurality of receivers 14. The receivers used for each antenna array 10 are different receivers than that which is found on a standard monopulse array. In accordance with an aspect of the present disclosure, receivers 14 are metamaterial electronically scanned array (MESA) receivers. The MESA receivers include a plurality of resonators that are powered to generate reference waves to electronically steer the beam based on the operation of the resonators. Each beam of each respective receiver is defined by a specific hologram of on and off resonators. Each MESA receiver has metamaterial elements, an integrated wave guide, a control logic layer, and may optionally include daughter boards. Further, each MESA receiver 14 may be covered by one radome or cover or a plurality of separate and distinct radomes. Typically, when viewed in cross-section, the resident elements are the uppermost portion of the MESA receiver below the radome cover. Beneath the metamaterial elements is the integrated wave guide. Beneath the integrated wave guide is the control logic layer. Below the control logic layer is the optional daughter boards. The bottom surface components, such as amplifiers, to control the operation thereof. A commercially available MESA receiver 14 is manufactured by Echodyne, model number MESA-K-EVU. The operation of the MESA receiver 14 uses the reference wave with controlled coupling to elements that can apply energy envelopes, including uniform energy envelopes. The active metamaterial surface is used to selectively turn on and off each resonator site. When the resonators are "on", they scatter radio frequency (RF) energy. This results in a hologram pattern. For the hologram pattern, the far field beam is the interference pattern between the reference wave and the hologram. By changing the hologram pattern, it is possible to electronically change the beam direction and shape. Currently, MESA receivers 14 are not used in an interferometric manner. Rather, they are conventionally utilized as antenna receivers configured to beam steer for signal detection applications. They have not been utilized for bearing detection relative to a remote target. Thus, system 100 of the present disclosure utilizes the antenna array 10 having MESA receivers 14 to perform interferometry calculations to determine the target 104 bearing utilizing the interferometer logic 110 to determine the difference in RF phase between each respective MESA receiver 114 at a single processing interval or "snapshot."

FIG. 3A-FIG. 3D depict the different embodiments of structural configurations of a plurality of MESA receivers 14 on each respective antenna array 10. FIG. 3A depicts first embodiment antenna array 10A as having three MESA receivers 14A, 14B, and 14C arranged in a linear configuration. More particularly, first receiver 14A has a center 16A, second receiver 14B has a center 16B, and third receiver 14C has a center 16C. Each of the centers 16A-16C are aligned along an imaginary linear axis 18.

FIG. 3B depicts the second embodiment antenna array 10B as having a first MESA receiver 14D, a second MESA receiver 14E, and a third MESA receiver 14F. First receiver 14D has a center 16D, second receiver 14E has a center 16E, and third receiver 14F has a center 16F. The structural configuration of the receivers 14D-14F have a modified linear (or triangular) configuration which results in the shape of an obtuse triangle relative to the centers 16D-16F. More particularly, center 16D and center 16F are aligned along axis 20. Center 16D is aligned with center 16E along axis 22. Center 16E is aligned with center 16F along axis 24. The distance 26 that which the center 16E of second MESA receiver 14E is offset from axis 22 could be in a range from about one centimeter to about ten centimeters. However, it should be noted that these exemplary ranges can vary as spacing is related to the wavelength or frequency of the signal and the number of elements 14 or size of the array. In one particular embodiment, distance 26 is about three centimeters. In another particular embodiment, distance 26 is about seven centimeters. Further, while it is shown that the center 16E has been dropped by distance 26, the second MESA receiver 14E may be offset in the vertical direction so that it is positioned above axis 20 rather than below it. However, it is to be understood that distance 26 offset from axis 20, which results in the obtuse triangular configuration would still operate as an interferometer in accordance with the present disclosure regardless of the position relative to axis 20 intersecting the centers of first receiver 14D and third receiver 14F.

FIG. 3C depicts the third embodiment antenna array 10C as having first MESA receiver 14G, second MESA receiver 14H, and third MESA receiver 14I. The center 16G of first receiver 14G is aligned with the center 16H of the second receiver 14H along axis 28. The center 16H of the second receiver 14H is aligned with the center 16I of the third MESA receiver 14I along axis 30. The center 16I of the third MESA receiver 14I is aligned with the center 16G along axis 32. Collectively, the axes 28, 30, 32 form a horizontal right triangular configuration.

FIG. 3D depicts the fourth embodiment antenna array 10D, which is similar to that of third embodiment antenna array 10C but having a vertically aligned right triangular configuration. More particularly, first MESA receiver 14J has a center 16J that is aligned with center 16K of second MESA receiver 14K along axis 34. Third MESA receiver 14L has a center 16L that is aligned with center 16K along axis 36. Center 16L is also aligned with center 16J along axis 38. Collectively, axes 34, 36 and 38 define a vertical right triangular configuration of the first, second and third MESA receivers 14J, 14K, and 14L, respectively.

As will be described in greater herein, each configuration of the antenna arrays 10 has advantages pending on application-specific needs that are able to use the MESA receivers 14 in an improved manner to determine the bearing of the target 104 relative to the platform 102 in an improved way beyond which that is available with standard monopulse arrays, which are similarly sized to antenna array 10.

Any of the MESA antenna interferometer arrays 10A-10D the present disclosure may be configured as a printed circuit board. It is a relatively low cost steerable antenna. The antenna configuration of the present disclosure provides relatively low size, weight, power, and cost (SWaP-C) because there are no moving parts, no expensive Transmit/Receive and phase shift modules behind each element, which enables this design to scan, find, and track remote objects at a lower system cost.

The present disclosure exploits a conventional MESA array and the receivers therein to operate as an interferometer, as traditionally, an interferometer is physically separated receivers comparing the phase and intensity of a received signal. The use of the MESA antenna receivers 14 enable multiple receivers trying to locate an intended target that are small enough to fit on a vehicle or platform 102. The system 100 of the present disclosure is able to be small and fit on a vehicle based on the utilization of the MESA antenna receivers 14. More particularly, the system of the present disclosure specifically designs for cost and vehicle applications in mind. The continuous wave (CW) tones that are transmitted by transmitter 12 of the present disclosure are enabling of the use of slower sampling parts. Thus, a lower sample rate enables the sampling of the signal to process a small amount of information. The design of the present disclosure is designed with a view towards low cost applications with as much performance as possible by increasing angular accuracy compared to other systems.

In accordance with an aspect of the present disclosure, when the antenna receiver is utilized having geometric configurations identified in FIG. 3A-3D, the receivers are able to detect a signal without knowing the location of the target. The system scans around the area of the detected signal with an unknown location. In one example configuration, the gain pattern of the antenna encompasses multiple ambiguities which require multiple scans to disambiguate the real target. This builds up a map within logic 110 of what the signal looks like over that area using the same antenna system of the present disclosure. This is accomplished by electronically directing the antennas to move or steer the beam in certain directions. For example, the first antenna element could move three degrees in a first direction and a second antenna element could steer the beam six degrees in a different direction. As another example, all antennas could steer three degrees in the same direction. The information obtained after steering the antenna beams is collected over each processing interval. Once enough information is gathered, the information is combined with the ambiguities from the interferometer logic 110 to determine the solution for which of the ambiguities is the real target location. The ambiguities that have less (or minimal) signal associated with them are determined to be false positives. This is accomplished by steering the antenna beam over a pattern surrounding the likely ambiguity locations. By monitoring the returns from each steering and combining with known beam pattern directivity or gain, the system determines where the most likely position of the target is located.

During the location determination process, the array 10 and receivers 14 scan around to a number of ambiguous bearings to construct a map of signal return strength at each of the ambiguity points. Effectively, ambiguity points are utilized first to obtain the bearings that are to be checked and then the beam is steered to each of the ambiguity points to determine whether a target return signal is located at a corresponding ambiguity point. This drastically reduces the processing time to locate a target rather than having to scan the entire search area. In one particular example, it does not need to be a one to one mapping of the ambiguity points. The system can still scan around the bearing locations of the ambiguities inasmuch as each beam pattern or beam steering may encompass two or more ambiguity locations.

Regarding ambiguities, the ambiguities must be addressed because a target that is located at any of the ambiguity points gives the receiver the same received signal phase, due to wrapping by 2 pi radians. Thus, when trying to solve for where the target is located, there are multiple locations where the target could be. As such, once the target is located, its position is able to be done with high accuracy. However, determining with certainty where the target is takes some effort.

Having thus described the various configurations of the various embodiments of antenna arrays 10A-10D, reference will now be made to their operation and how they can be used as an interferometer by determining ambiguities in the received signals to quickly obtain a bearing to the target 104. Generally, each antenna array 10A-10D uses multiple MESA receivers 14 to provide a bearing to the target 104 through interferometry. Each receiver 14 measures the relative phase of the return signal 108 and the phase difference between each pair of receivers 14 on the array 10. The expression for phase difference in a two-element interferometer is

$$\Delta\varphi + 2\pi N = \frac{2\pi}{\lambda} D\sin(\theta) \quad (1)$$

where, $\Delta\varphi$ is the measured RF phase difference between two antennas; D is the spacing between antenna phase centers 16; $\theta$ is the bearing angle to the target 104; $\lambda$ is the wavelength of the carrier signal 108; and N is the ambiguity number.

By way of example, presume the following parameters: D=22 cm and $\lambda$=1.23 cm. Then, $\Delta\varphi+2\pi N=112 \sin(\theta)$ It can be seen that for small changes in bearing angle, $\theta$, there are large changes in the measured phase difference, $\Delta\varphi$. Rearranging the Equation 1, provides:

$$\theta = \frac{\lambda}{2\pi D}\sin^{-1}(\Delta\varphi + 2\pi N) \quad (2)$$

Note that the measurements of $\Delta\varphi$ are modulo $2\pi$. This is the source of the ambiguities that need resolution in order to determine the actual bearing angle, $\theta$.

Figure 4A:
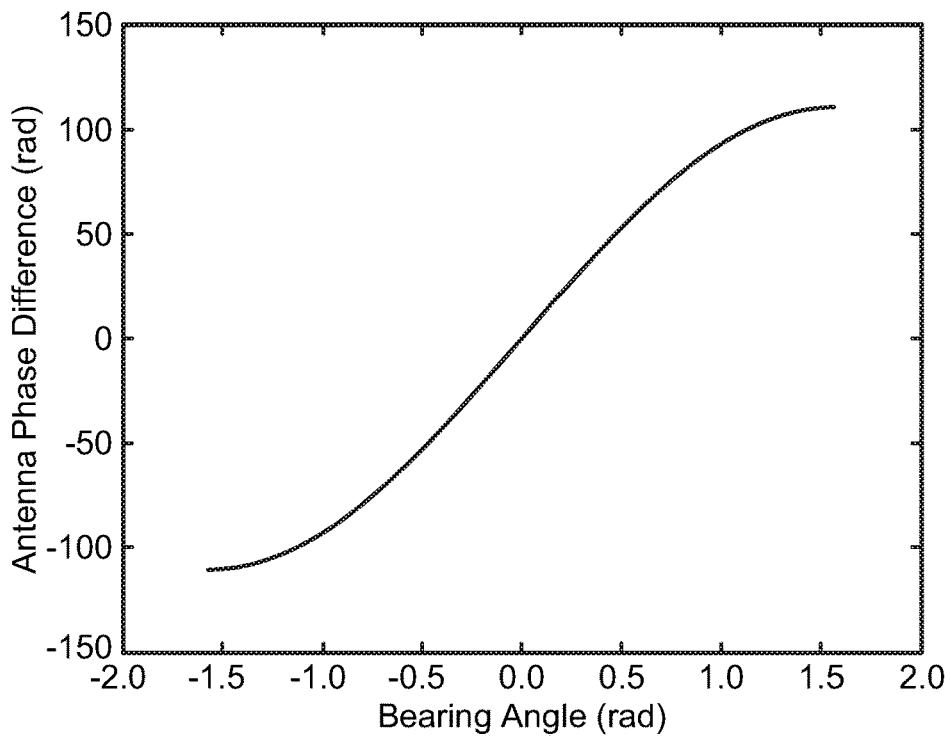
FIG. 4A is a plot graph for an antenna phase difference relative to bearing angle.
Figure 4B:
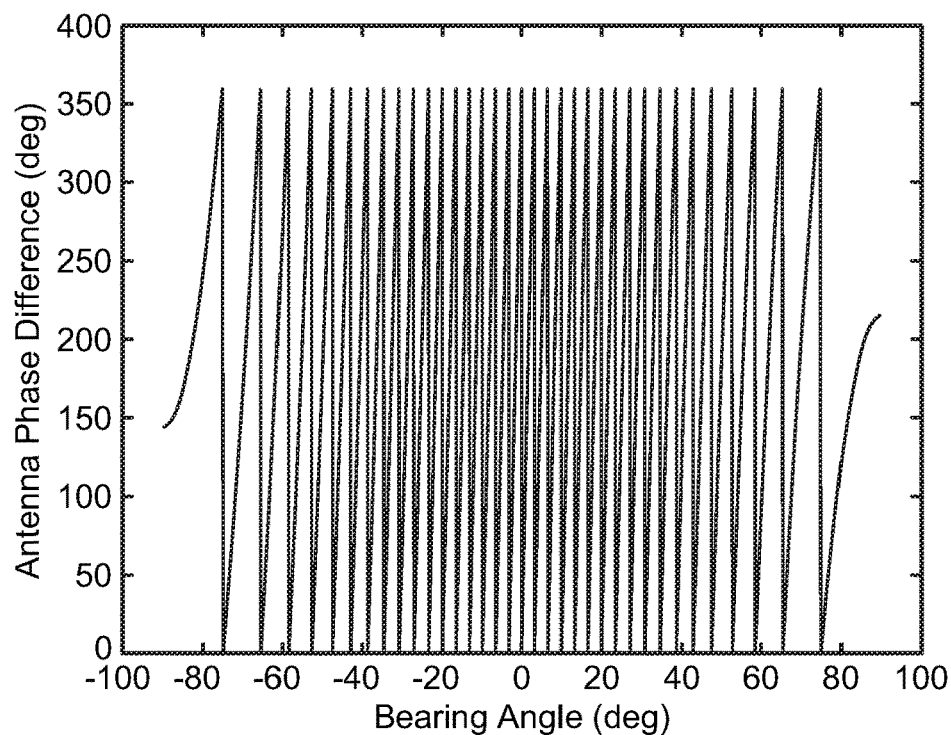
FIG. 4B is plot graph depicting that the bearing angle is ambiguous due to phase wrapping.

Using the above example parameters, FIG. 4A and FIG. 4B shows the RF phase (radians) vs bearing angle (radians) and the RF phase (degrees) vs ambiguous bearing angle (degrees). Although the plot of FIG. 4A appears to be an easy, smooth conversion from antenna phase difference to bearing angle, it is deceiving. As the plot of FIG. 4B shows, the bearing angle is ambiguous, because the antenna phase wraps every 2 pi radians (or 360 degrees). In this plot, there are approximately 35 ambiguous bearings for any one antenna phase. Near broadside (0 degrees bearing), there are 360 degrees of RF phase difference between the two antennas for every 2.79 degrees of bearing change, or 129 RF phase degrees per bearing degree, or 0.00776 bearing degrees per RF phase degree. This has advantages and drawbacks that are exploited by the system of the present disclosure. One drawback is the system has an ambiguity every 2.79 degrees in bearing. However, it is advantageous as the system is not extremely sensitive to an error in RF phase difference measurement. An error in RF phase must be >12.9 degrees for a 0.1 degree error in bearing.

Figure 5A:
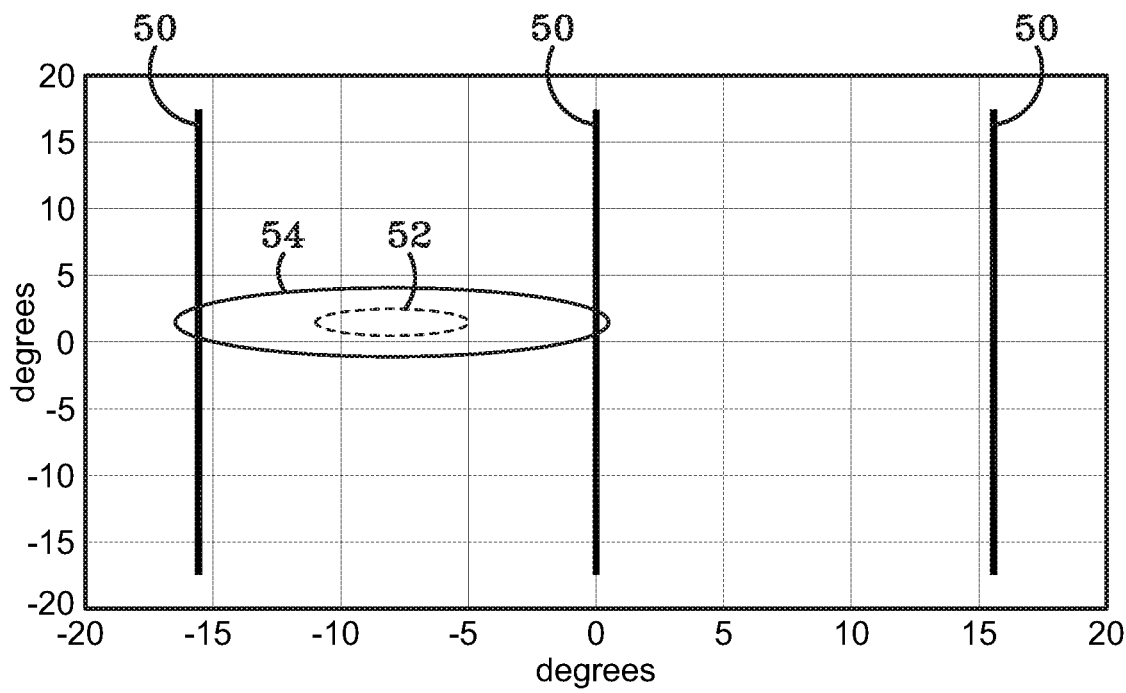
FIG. 5A is a graph depicting the product of marginals of ambiguities associated with the antenna configuration of FIG. 3A.

Applying this knowledge to the linear antenna configuration shown in FIG. 3A, with the addition of a third receive antenna (i.e., antenna 14C), careful selection of the antenna spacing can cancel out many of the ambiguities. In essence, each pair of antennas has its own set of ambiguities, and those ambiguities only overlap/agree at more infrequent spacing than any of the individual pairs. As an example, in the first embodiment antenna array 10A having three receive antennas 14A, 14AB, and 14C, that are vertically polarized (1×4) linear configuration: Antennas 14A and 14B are spaced 8.74 cm apart; Antennas 14B and 14C are spaced 13.1 cm apart; and Antennas 14A and 14C are spaced 21.84 cm apart. In this configuration array 10A behaves as: Ambiguity spacing=lambda/baseline (in radians) is 8.07, 5.38, 3.23 degrees, respectively; and the joint ambiguity spacing is 16° apart. FIG. 5A depicts the resulting ambiguities 50 when these three solutions are combined and shows a beam size of −3 dB gain 52 and −10 dB gain 54 for reference. Although the interferometric bearing solution has no elevation accuracy, it does have good azimuth accuracy and it also pushes out the potential ambiguities to every 16 deg in azimuth. The beam width in elevation (2 deg, −3 dB two-way) is all the information you get for elevation accuracy.

Figure 5B:
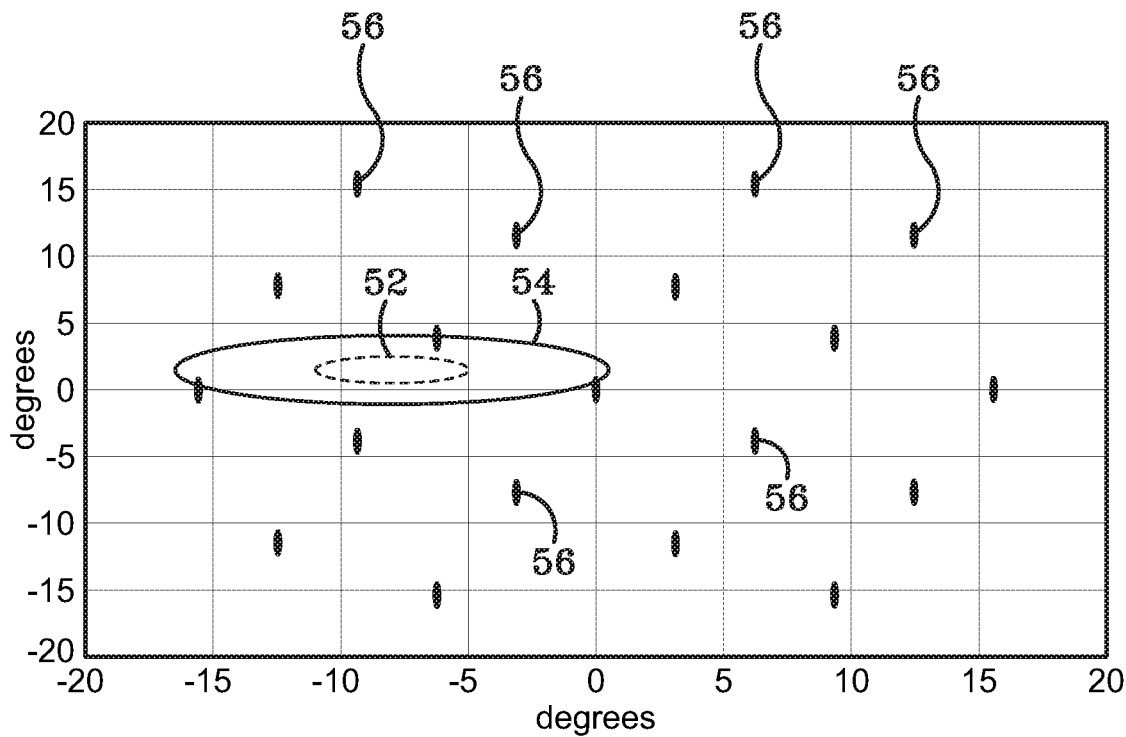
FIG. 5B is a graph depicting the product of marginals for ambiguities of the antenna configuration of FIG. 3B.
Figure 5C:
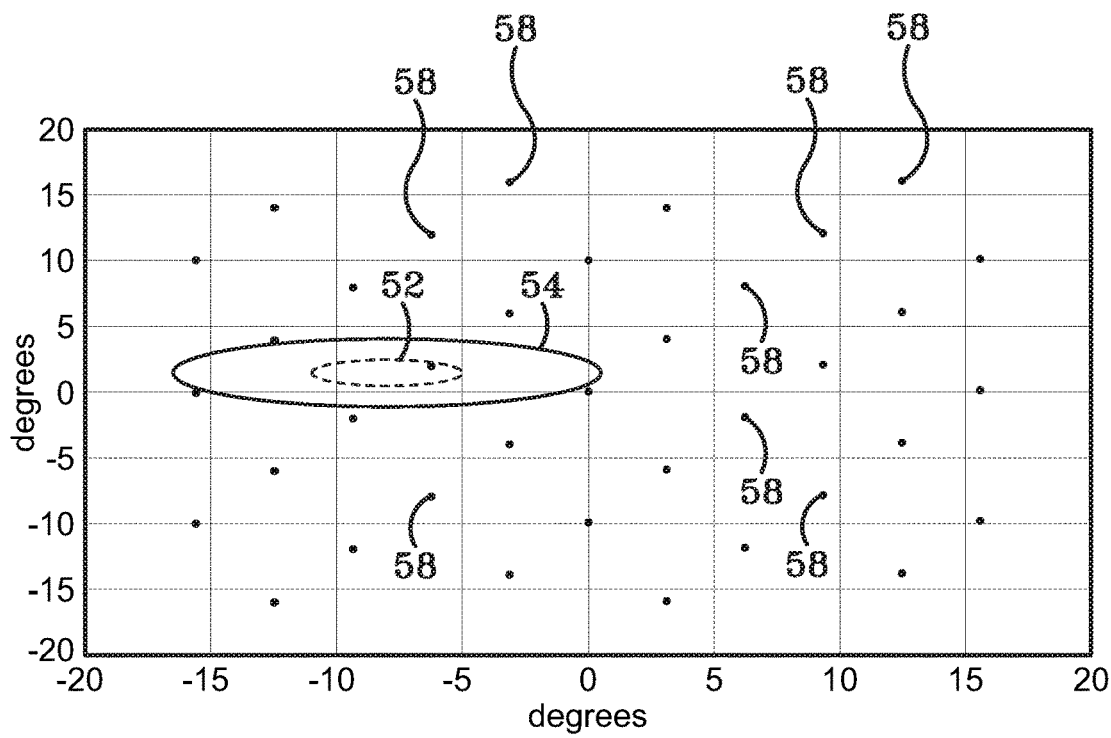
FIG. 5C is a graph depicting the product of marginals for ambiguities associated with the antenna configuration of FIG. 3B having a differing size triangular configuration.

Again using the exemplary parameters identified herein and applying them to the modified linear configuration of array 10B shown in FIG. 3B, when the three receive antennas 14D, 14E, and 14F are not co-linear, then the ambiguities occur as a joint mixture of azimuth and elevation information. This geometry lowers the middle antenna 14E by (such as about 3.6 cm or 7 cm) relative to the linear configuration. It also uses vertical polarization of the beams. Horizontal separation is 9 cm for Antennas 14D and 14E and 13.5 cm for Antennas 14E and 14F. FIG. 5B depicts the resulting ambiguities 56 for an approximate 3.6 cm downward shift (i.e., distance 26) of antenna 14E when these three solutions are combined and shows a beam size of −3 dB gain 52 and −10 dB gain 54 for reference. FIG. 5C depicts the resulting ambiguities 58 for a 7 cm downward shift of antenna 14E when these three solutions are combined and shows a beam size of −3 dB gain and −10 dB gain for reference.

Figure 5D:
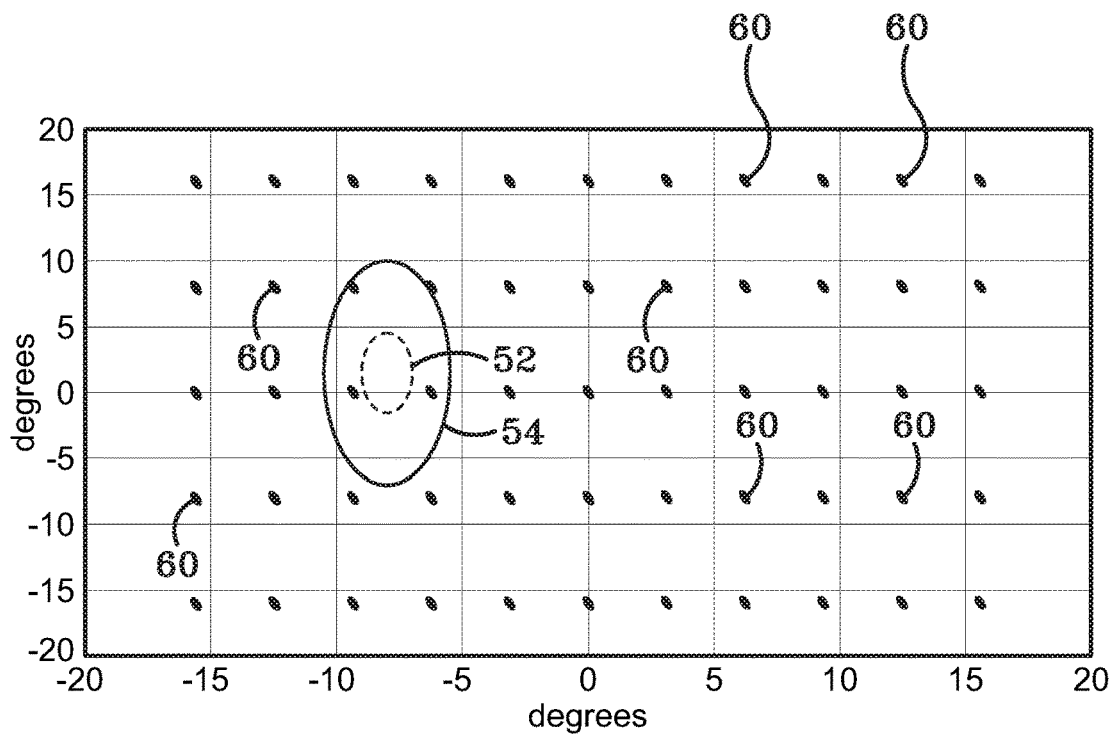
FIG. 5D is a plot of the product of marginals of the ambiguities associated with the antenna configuration of FIG. 3C.

Again using the exemplary parameters identified herein and applying them to the horizontal triangular linear configuration of array 10C shown in FIG. 3C, when the three receive antennas 14G, 14H, and 14I are not co-linear, then the ambiguities occur as a joint mixture of azimuth and elevation information. This geometry arranges the antennas 14G, 14H, and 14I in a right horizontal triangle. It also uses horizontal polarization of the beams. The horizontal separation between antennas 14G and 14H is 23 cm and the vertical separation between antennas 14H and 14I is 8.8 cm. FIG. 5D depicts the resulting ambiguities 60 when these three solutions are combined and shows a beam size of −3 dB gain and −10 dB gain for reference.

Figure 5E:
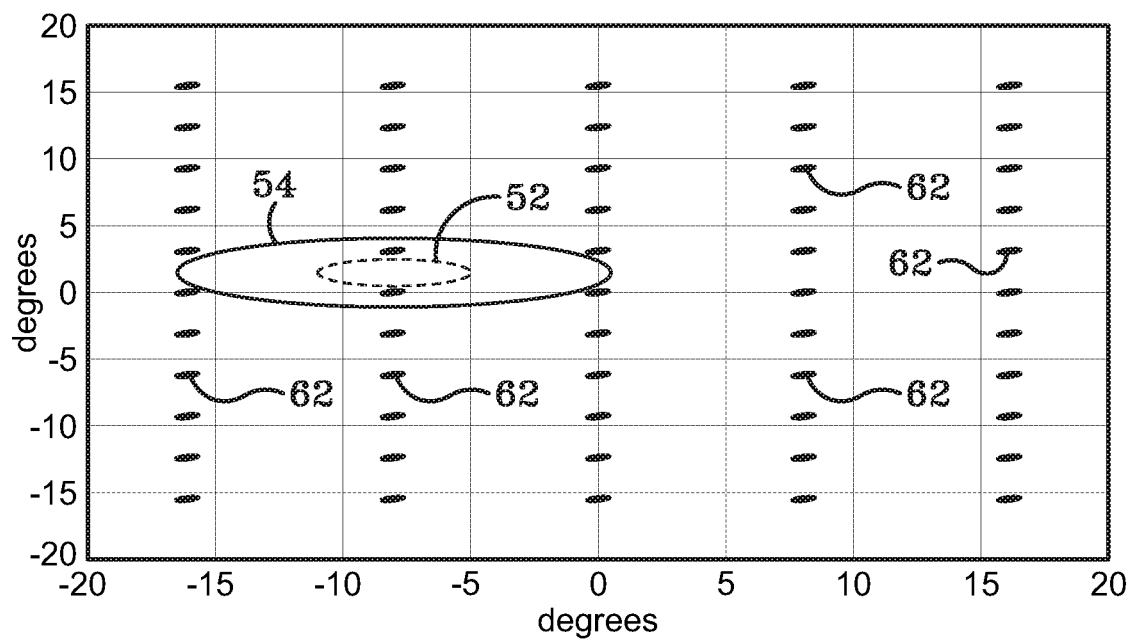
FIG. 5E is a graph depicting the product of marginals of ambiguities associated with the antenna configuration of FIG. 3D.

Again using the exemplary parameters identified herein and applying them to the horizontal triangular linear configuration of array 10C shown in FIG. 3D, when the three receive antennas 14J, 14K, and 14L are not co-linear, then the ambiguities occur as a joint mixture of azimuth and elevation information. This geometry arranges the antennas 14J, 14K, and 14L in a right vertical triangle. It also uses vertical polarization of the beams. The horizontal separation between antennas 14J and 14K is 23 cm and the vertical separation between antennas 14K and 14L is 8.8 cm. FIG. 5E depicts the resulting ambiguities 62 when these three solutions are combined and shows a beam size of −3 dB gain 52 and −10 dB gain 54 for reference.

Resolving the ambiguities for any of the configurations can have the detections pass through an M of N filter and signal-to-noise ratio (SNR) threshold before further investigation. Once promoted past these filters, a list of nearby ambiguous bearing potential solutions is calculated and sequentially investigated through multiple transmit (Tx) and receive (Rx) beam steerings to monitor the signal (SNR, phase, bearing, etc.) for each potential solution. In another example, the area containing the ambiguities can be investigate with fewer steering steps than the number of ambiguities. The candidate with the highest likelihood score is declared as the real target location and the tracker is initiated with this location. The "modified linear" configuration array 10B has up to 3-4 ambiguous solutions that surround the Tx bearing and fall within the −10 dB two-way beam width. The "normal triangle" configuration array 10C has ~6 ambiguous solutions that surround the Tx bearing and fall within the −10 dB two-way beam width. The "rotated triangle" configuration array 10D has ~6 ambiguous solutions that surround the Tx bearing and fall within the −10 dB two-way beam width.

Further regarding the ambiguities, as electromagnetic waves transmit from the target and back to the receiver, the distance that the signal travels determines the phase shift of the signal. Depending on the antenna spacing and the wavelength of the light or signal, outside of some small angular subtense there will be phase wrapping in the phase difference between any set of antennas. Phase wrapping occurs when the receiver is trying to observe or detect the phase of the incoming electromagnetic wave from the intended target. However, each receiver is in a different position, so the path length that the wavelength takes to get to each receiver is different. The system compares the phases, which are proportional to path length, between at least two receivers. When the comparison occurs, it results in a value between zero and $2\pi$ radians (360 degrees). The system is unable to distinguish the difference between zero and 360 degrees and 360 degrees and 720 degrees and other multiples of 360 degrees. In other words, every 360 degrees in terms of phase the signal looks the same. As the signal passes 360 degrees or $2\pi$, the plot associated with the signal wraps around due to the modulo $2\pi$ effect.

The number and spacing of ambiguities depends on wavelength and the spacing of the antennas in the array. The location of the ambiguities depend on the above, as well as the location of the antennas in the array. Thus, aspects of the present disclosure relate to different geometric configurations of the antenna elements relative to each other such that the number and location of ambiguities are reduced to a set that is solvable to calculate a target location with a degree of certainty. The closer the antennas are together, the farther apart the resulting ambiguities will show on a product of marginals graph. Conversely, the farther the antenna elements are from each other the closer the ambiguity locations are plotted on a product of marginals graph (i.e., FIG. 5A-FIG. 5E).

As detailed herein, the three receivers in the antenna array can be arranged in a number of different configurations. Some exemplary configurations include a linear configuration, a modified linear configuration, a normal triangle configuration and a rotated triangle configuration. With respect to the linear configuration, the advantages enable azimuth accuracy and there are very few ambiguities within the beam width so that it is easy to disambiguate the real target. The two ellipses shown in the graph as 52, 54 represent size scaling for reference for the gain pattern of the antennas in the linear configuration. Thus, at about 10 dB off of peak, there are only two ambiguities that the system is looking at. As shown in the plot, there is an ambiguity approximately every 16 degrees with high azimuth accuracy. However, there is a weak elevation accuracy because none of the antennas are separated in the vertical direction. Thus, the linear configuration is not very accurate with respect to elevation accuracy except for what is contained in the beam width. With respect to the modified linear configuration, which refers to one of the receivers being offset from an axis intersecting the other two receivers. In one particular embodiment, the center of the second antenna element has been offset from the centers of the first and third elements approximately 3 centimeters. An advantage of the modified linear configuration is that it adds elevation accuracy to the ambiguities. Elevation accuracy continues to be increased the further the second element is offset from the other two elements, but the farther the second element is offset from the other two elements, the closer the ambiguities become. Thus, it is a balancing determination for the system designer to determine elevation accuracy versus how many ambiguities can be tolerated within the beam pattern. Effectively, the system designer needs to determine how much effort and time can be allocated to disambiguating the ambiguities.

The first ellipse shown in the plot represents a 3 dB gain 52 and the large, second ellipse represents a 10 dB gain 54. The two ellipses represent size references in angle space because it is one way to simplify and reduce the number of ambiguities because if the beam is not pointed at the target, then there will be much reduced amplitude in the signal. But, if the beam is pointed at the target, then there is likely a greater amplitude in the return signal. Thus, these two ellipses visually guide the designer in evaluating the potential solutions (bearing ambiguities) that are available in the decision processing for the most likely solution.

The location of the target would be at, or near to, one of the ambiguity points; however, it does not necessarily have to be at the point located within the first or second ellipse regions representing gain 52, 54, which are shown for reference only. The ambiguity may be located by steering the beam around a multiplicity of times to further reduce the number of likely ambiguities in the plot.

With respect to the triangular configurations whether in a normal or horizontal configuration or a rotated or vertical configuration, they provide good elevation and azimuth accuracy; however, physically, the geometry may sometimes be more difficult to work into a platform due to the physical arrangement relative to the external surface of a platform inasmuch as platform designers typically prefer to have configurations that are conformal or near conformal to the exterior surface of the platform. While the triangular configurations provide better elevation accuracy than the modified linear configuration, it comes at the cost of more ambiguities that need to be discerned.

The following Table 1 (provided below) attempts to summarize various important parameters of the trade space on antenna geometry configurations. This particular table summarized values of one particular set of antennas, operating frequencies, and processing intervals, along with characteristic values for these example configurations. It is recognized by those skilled in the art that many other values and configurations can be tabulated with different or similar performance.

Another approach modifies this design by shifting the middle receive antenna downward some distance. Three centimeters is shown for reference. This configuration provides some interferometric elevation information allowing for more accurate tracking and reporting. This configuration maintains good azimuth accuracy, due to the far horizontal separation in antennas.

When more elevation accuracy is required than the "modified linear", then a version of the "rotated triangle" would be the recommended approach. This design provides enhanced bearing accuracy at the expense of more bearing ambiguities that must be solved. Solving more ambiguities results in slightly longer track initialization time, but the enhanced accuracy may be beneficial, depending on the end use cases.

Another example configuration is the "normal triangle" design. In one example, this configuration utilizes horizontal polarization which can increase the ground reflectance and multipath effects, thus reducing elevation accuracy and modifying received signal strength.

TABLE 1

|  | Normal Triangle | Rotated Triangle | Linear | Modified Linear |
|---|---|---|---|---|
| Beamwidth (−3 dB two-way) | 2 × 6° (H × V) | 6 × 2° (H × V) | 6 × 2° (H × V) | 6 × 2° (H × V) |
| Polarization | Horizontal | Vertical | Vertical | Vertical |
| Approximate Footprint | 18 × 7" | 18 × 7" | 17 × 9" | 17 × 10"/17 × 11" |
| Bearing Ambiguities | ~6 ambiguities | ~6 ambiguities | 2 ambiguities + Elevation Dither | 3/5 ambiguities |
| Reference 1 Track Initialization with 9.5 ms CPI | 300 ms | 300 ms | 260 ms | 190 ms/260 ms |
| Reference 2 Track Initialization with 4.7 ms CPI | 110 ms | 110 ms | 100 ms | 75/100 ms |
| Multipath (qualitative impact) | Significant multipath (Elevation is often wrong) | Reduced multipath, resulting in better Elevation estimate | Reduced multipath, resulting in better Elevation estimate (with SNR following; etc.) | Reduced multipath, resulting in better Elevation estimate |
| Antenna gain | Better for | Better for | Better for | Better for |

TABLE 1-continued

|  | Normal Triangle | Rotated Triangle | Linear | Modified Linear |
|---|---|---|---|---|
| pattern orientation benefits | quick vertical motion | quick horizontal motion | quick horizontal motion | quick horizontal motion |
| Notional Elevation Accuracy | 0.3° | 0.1° | ~2° | 0.8°/0.4° for 3 cm/7 cm shift (respectively) |
| Notional Azimuth Accuracy | 0.1° | 0.3° | 0.1° | 0.1° |

With respect to the bearing ambiguities referenced above in Table 1, the linear configuration of antenna array 10A shown in FIG. 3A has approximately two ambiguities plus elevation dither (no phase information in elevation except for the signal strength). As such, the linear configuration of array 10A requires dithering to estimate where the target is in elevation. Further with respect to the bearing ambiguities and the modified linear configuration of array 10B shown in FIG. 3B, the bearing ambiguities depends on the distance the second receiver is offset from the first and third receivers. The number before the slash (3/5) corresponds to different offset distances. The first number refers to a three centimeter offset and the second number refers to a seven centimeter offset. Thus, for an about three centimeter offset of the second antenna, there are three ambiguities. For an about seven centimeter offset, there are five ambiguities.

Theoretical standard deviations are calculated for monopulse and interferometer configurations. Equations for these RMS values are found using the following approach.

For an array of N elements spaced $\lambda/2$:

$$\sigma_\theta^2 = \frac{6}{\pi^2 \cos^2(\theta) N(N+1) SNR}$$

$$\sigma_\theta = \frac{\sqrt{6}}{\pi \cos(\theta)\sqrt{N(N+1) SNR}}$$

If N=2 and the spacing is D, this simplifies to:

$$\sigma_\theta = \frac{\lambda}{2\pi D \cos(\theta)\sqrt{SNR}}$$

Monopulse Accuracy is typically stated as:

$$\sigma_\theta = \frac{\theta_{BW}}{k\sqrt{2SNR}} = \frac{0.866\lambda}{\sqrt{2}\, kL\cos(\theta)\sqrt{SNR}}$$

K is typically in the range of 1.4 to 1.6. For a linear array of length L, the half power beam width is given by:

$$\theta_{BW}(\text{rad}) = \frac{0.866\lambda}{L\cos(\theta)}$$

In the example hardware shown in Table 1, D/L=1.5 for the long dimension, and 1.83 for the short dimension. Combining these equations and values result in the following monopulse accuracy:

$$\sigma_\theta \cong \frac{0.866\lambda(1.5 \text{ or } 1.83)}{\sqrt{2}\, 1.6 D\cos(\theta)\sqrt{SNR}} = \frac{\lambda}{(1.73 \text{ or } 1.42) D\cos(\theta)\sqrt{SNR}}$$

As a point of reference, comparing the interferometer and monopulse equations and values from above, it is seen that the interferometer provides bearing error that is typically 3-5× better than monopulse.

When the antenna array is acting as an interferometer, it will determine a geometrical area and vector from the antenna array that an emitter, target or object being tracked lies on. The geographic area will typically, but is not required to, intersect the earth giving a line of position (LOP) for the emitter, target or object being tracked. The intersection of this geometrical area with a tangent plane at the emitter, target or object being tracked is a conic section, usually a parabola. This parabolic LOP has a thickness or uncertainty due to the interferometer phase measurement error due to the fact that the elements are spaced apart by more than one-half wavelength. The error can be reduced by extending the baseline length between the antenna phase centers. It can also be reduced at higher emitter frequencies, or shorter signal wavelengths.

Increasing the spacing between the antenna phase centers 16, i.e., increasing the baseline vector, proportionally improves the LOP accuracy. However, increasing the baseline length beyond a half wavelength ($\lambda/2$) of the signal source generates phase measurement ambiguities. This means that the interferometer phase is measured modularly in a series of $2\pi$ radians or 360 degrees.

Figure 6:
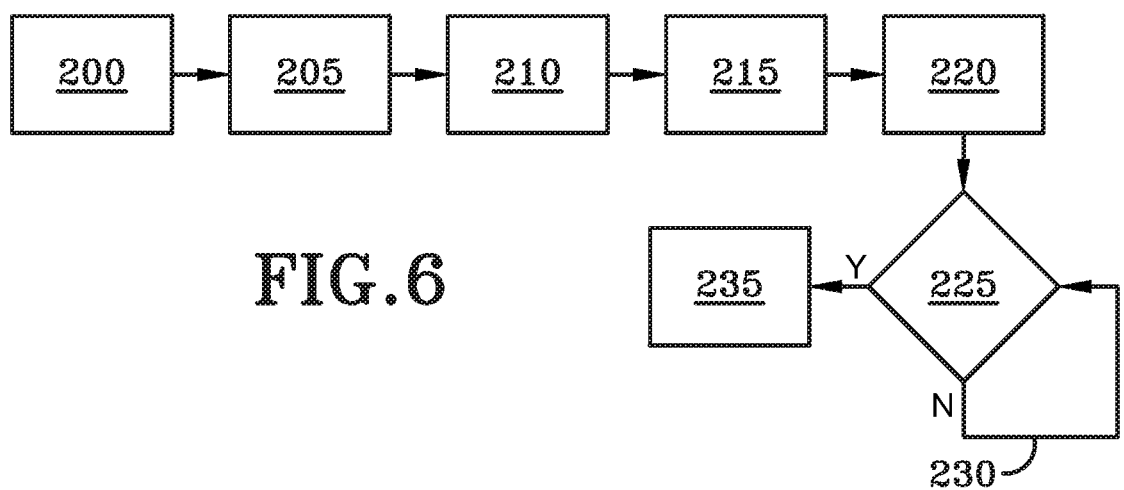
FIG. 6 is a flow chart according to an exemplary method in accordance with one aspect of the present disclosure.

FIG. 6 shows a flow diagram of how the system works. Upon detection, the area immediately around, geographically in 2D angular space, to the target 104 is scanned, which is shown generally at 200, to create a library of data immediately adjacent to the target. The target and ambiguities will be returned and processed by the system, which is shown generally at 205. As seen in FIG. 5A, a sample return is shown for a linear antenna element array. As can be seen, there are typically only 2 or three ambiguities on the azimuth axis, however, there is no elevation accuracy. As seen in FIG. 5D and FIG. 5E, a triangular antenna alignment shows a sample return that is processed by the system. As can be seen in FIG. 5D and FIG. 5E, there are a large number of ambiguities. FIG. 5B and FIG. 5C is a sample return of the modified linear or obtuse triangle alignment depending on the physical drop of the middle receiver, such as 3.6 cm or 7 cm, respectively. The number of ambiguities is much smaller than those of the other systems. Table 1 above, also lists the number of ambiguities that are present from each system. As seen in Table 1, the number of ambiguities for the modified linear system is much lower than the other systems and is the preferred alignment for the receiving and transmitting elements.

The system will compare the signals received, which is shown generally at 210, and determine the potential target ambiguities, which is shown generally at 215. The system is then told, either manually or electronically, to scan the immediate area, focusing on each ambiguity (or a subset of ambiguities), to determine if the ambiguity is a real target or phase measurement ambiguity, which is shown generally at 220. This step is accomplished by focusing the array on the location of each potential target and ambiguity, or a group of ambiguities). Once the system is steered to a specific, two-dimensional bearing, the array will determine if a valid target detection has occurred by mapping the returned signals in the area of the ambiguities of interest, and the resulting analysis determines the most-likely real-target solution, which is shown generally at 225. If there if not a valid target detection, the system will move on to the next ambiguity or potential target and repeat the determination for the next point, which is shown at 230. If a valid target is detected, then the system will present that position to a user or other computer system, which is shown generally at 235.

While FIG. 3B depicts one preferred arrangement of antenna elements, it is possible to modify this design by shifting the middle receive antenna downward some number of centimeters. As seen in Table 1, 3 cm and 7 cm shifts have been tested, but other shifts can be used, and the optimum shift can be determined by those of skill in the art for each desired operational use. This modified linear or obtuse triangle configuration will provide some interferometric elevation information allowing for more accurate tracking and reporting. This configuration also has good azimuth accuracy, due to the far horizontal separation in antennas.

If more elevation accuracy is required than the "modified linear", then the "triangle" would be the recommended approach. The triangle can be rotated so it is vertical or horizontal. A vertical rotation would have enhanced bearing accuracy at the expense of more bearing ambiguities that must be solved. Solving more ambiguities results in slightly longer track initialization time, but the enhanced accuracy may be beneficial, depending on the end use cases.

If more accuracy is required than provided by the example/reference designs here, the spacing between antennas can be further increased (at the expense of introducing more ambiguities), and/or more antennas can be added to the configuration/geometry. For example, 4, 5, or more receive antennas could be utilized and when combined with the existing 3 antennas, new sets of interferorometer baselines would be generated to increase the accuracy and reduce the number of ambiguities in the likely solution set.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the wavelength of operation and the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An electronically steered antenna system comprising:
a plurality of Metamaterial Electronically Scanning Array (MESA) receivers that are arranged in an array;
the plurality of MESA receivers operable to receive a plurality of reflected electromagnetic frequency signals;
interferometer logic coupled to the plurality of MESA receivers and operable to:
switch the electronically steered antenna system from a monitoring mode into an interferometer mode after one or more of the reflected electromagnetic frequency signals cross a signal-to-noise (SNR) threshold;

receive the reflected electromagnetic frequency signals from the plurality of antenna elements as they are moved with respect to a target location;

determine a number and location of ambiguities received in the reflected electromagnetic frequency signals;

determine which of the ambiguities represents a real object at the target location; and acquiring angular information for the object at the target location using the electronically steered antenna system in the interferometer mode.

2. The electronically steered antenna system of claim 1, further comprising:

one of a two-dimensional configuration and a three-dimensional configuration of the MESA receivers arranged in the array.

3. The electronically steered antenna system of claim 2, further comprising:

at least three antenna MESA receivers in the array that are each coupled with the interferometer logic.

4. The electronically steered antenna system of claim 3, further comprising:

a fixed orientation of each MESA receiver relative to the other MESA receiver in the array.

5. The electronically steered antenna system of claim 4, further comprising:

a linear configuration of the three MESA receivers.

6. The electronically steered antenna system of claim 4, further comprising:

a modified linear configuration of the three MESA receivers.

7. The electronically steered antenna system of claim 4, further comprising:

an obtuse triangular configuration of the three MESA receivers.

8. The electronically steered antenna system of claim 4, further comprising:

a scalene triangular configuration of the three MESA receivers.

9. The electronically steered antenna system of claim 4, further comprising:

a right triangular configuration of the three MESA receivers.

10. The electronically steered antenna system of claim 1, further comprising:

wherein the plurality of MESA receivers are operable to receive electromagnetic frequency signal through a range of frequencies that are stepped or continuous.

11. The electronically steered antenna system of claim 10, wherein the range of frequencies extends from 5 MegaHertz to 130 Gigahertz.

12. The electronically steered antenna system of claim 10, wherein the plurality of MESA receivers are operable to repeatedly step the transmitted electromagnetic-frequency signals through the range of frequencies.

13. The electronically steered antenna system of claim 1, wherein the plurality of MESA receivers are configured on a moveable platform.

14. The electronically steered antenna system of claim 13, wherein the moveable platform is a land-based vehicle.

15. The electronically steered antenna system of claim 1, wherein the plurality of MESA receivers are operable to receive at least a portion of the reflected electromagnetic-frequency signals with a vertical spacing of one MESA receiver that differs from another MESA receiver.

16. The electronically steered antenna system of claim 1, further comprising:

a target acquisition rate;

wherein the antenna array is arranged so that the antenna array detects some number of ambiguities to be investigated; and wherein two antenna MESA receivers have respective centers that are positioned along a common axis and a MESA receiver having a center that is placed between and offset from the common axis.

17. A method comprising:

detecting, via a plurality of Metamaterial Electronically Scanning Array (MESA) receivers in an electronically steered antenna system, a signal representing the presence of an object at a target location;

scanning an area around the target location;

receiving data representing ambiguities and the object after scanning the area;

comparing the received data;

mapping the ambiguities;

electronically steering the antenna system to scan an area around at least one ambiguity having been mapped;

determining whether the ambiguity represents the object at the target location or is an ambiguity that is a result of phase wrapping ambiguity in the received data;

determining that if there is not a valid target detection, then electronically steering the antenna system to the next ambiguity or potential target and repeat the determination for the next point;

determining that if there is a valid target detection, then starting one or more tracks and transmitting that data to a user or other computer system;

acquiring and tracking the target with the electronically steered antenna system having a plurality of MESA receivers;

estimating a range to the target and estimating a range-rate of the target compiling a database of the geographical area immediately surrounding the target switching the antenna system from a monitoring mode into an interferometer mode after the signal crosses a signal-to-noise ratio (SNR) threshold;

determining a number and location of ambiguities received in reflected electromagnetic frequency signals;

determining which of the ambiguities represents the object at the target location; and acquiring angular information for the object at the target location using the electronically steered antenna system in the interferometer mode.

18. The method of claim 17, further comprising dynamically reconfiguring the electronically steered antenna system between the monitoring mode and the interferometer mode to update the range, range-rate, and the angular information.

* * * * *